(12) United States Patent
Kato

(10) Patent No.: US 8,223,184 B2
(45) Date of Patent: Jul. 17, 2012

(54) SCANNING OPTICAL DEVICE AND IMAGE FORMING APPARATUS USING THE SAME

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 475 days.

(21) Appl. No.: 12/436,321

(22) Filed: May 6, 2009

(65) Prior Publication Data

US 2009/0279919 A1    Nov. 12, 2009

(30) Foreign Application Priority Data

May 8, 2008 (JP) ................................. 2008-122210

(51) Int. Cl.
B41J 15/14 (2006.01)
B41J 2/435 (2006.01)
B41J 27/00 (2006.01)

(52) U.S. Cl. ........ 347/241; 347/236; 347/256; 347/260; 347/261

(58) Field of Classification Search .................. 347/236, 347/241, 256, 260, 261
See application file for complete search history.

(56) References Cited

U.S. PATENT DOCUMENTS

| 6,683,708 | B2* | 1/2004 | Shiraishi et al. | 359/207.1 |
| 6,760,138 | B2* | 7/2004 | Shimomura | 359/212.1 |
| 7,145,705 | B2* | 12/2006 | Hayashi | 359/204.1 |
| 7,251,067 | B2* | 7/2007 | Kudo | 359/205.1 |
| 2005/0185236 | A1* | 8/2005 | Kudo | 359/205 |
| 2007/0109560 | A1* | 5/2007 | Sprague et al. | 358/1.1 |
| 2009/0185826 | A1* | 7/2009 | Tanimura et al. | 399/151 |

FOREIGN PATENT DOCUMENTS

| JP | 2005062834 A | 3/2005 |
| JP | 2005-266775 A | 9/2005 |
| JP | 2006162884 A | 6/2006 |
| JP | 2006267398 A | 10/2006 |
| JP | 2007322876 A | 12/2007 |

* cited by examiner

*Primary Examiner* — Laura Martin
*Assistant Examiner* — Jeremy Bishop
(74) *Attorney, Agent, or Firm* — Canon U.S.A., Inc. IP Division

(57) ABSTRACT

A scanning optical device includes a deflector for scanningly deflecting a plurality of light beams from a plurality of light sources, and an imaging optical system for imaging the light beams upon a plurality of scan surfaces to be scanned, wherein at least one piece of reflecting element is provided at each of a plurality of light paths extending from the deflector toward the scan surfaces.

6 Claims, 6 Drawing Sheets

SCANNING OPTICAL DEVICE AND IMAGE FORMING APPARATUS USING THE SAME

FIELD OF THE INVENTION AND RELATED ART

This invention relates to an optical scanning device and an image forming apparatus using the same. The present invention is suitably usable in an image forming apparatus such as a laser light beam printer, a digital copying machine or a multifunction printer, for example, having an electrophotographic process.

Conventionally, in an optical scanning device for a laser-light beam printer (LBP) or a digital copying machine, a light beam from a light source being optically modulated in accordance with an imagewise signal is periodically deflected by an optical deflector (deflection means) which is comprised of rotating polygon (polygon mirror). The deflected light beam is then focused by an imaging optical system having an fθ characteristic into a spot-like shape upon a photosensitive recording medium (photosensitive drum), whereby the surface thereof is optically scanned and image recording is carried out.

FIG. 10 is a schematic diagram of a conventional scanning optical device.

In the diagram, a divergent light beam emitted from light source means 1 is transformed by a collimator lens 2 into parallel light beam and, after restricted by an aperture stop 9 when the beam passes therethrough, the light beam is incident on a cylindrical lens 4. Within the main-scan plane, the parallel light beam incident on the cylindrical lens 4 goes out of the same while being unchanged. Within the sub-scan plane, on the other hand, the light beam is converged and imaged as a line image on the deflection surface (reflection surface) 5a of the deflection means 5 (deflection element) comprised of a polygon mirror. The light beam deflectively reflected by the deflection surface 5a of the deflection means 5 is directed to a scan surface (surface to be scanned) 8 through an imaging optical element (fθ lens) 6 having an fθ characteristic. Then, rotating the deflection means 5 in a direction of an arrow A, the scan surface 8 is scanned in the direction of an arrow B (main-scan direction).

Conventionally, a wide variety of proposals have been made in regard to tandem type scanning optical devices (see patent document No. 1).

FIG. 11 is a sectional view (sib-scan sectional vie) of a main portion of a conventional tandem type scanning optical device in the sub-scan direction. The tandem type scanning optical device is a scanning optical device which is configured to simultaneously scan a plurality of scan surfaces corresponding to different hues in color image formation.

In FIG. 11, what can be called an input optical system from a plurality of light source means to deflection means is unshown. In the diagram, a plurality of light beams scanningly deflected by the deflection means 5 are directed to different scan surfaces 8x via corresponding imaging optical elements 61x and 62x and reflection elements 71x, 72x and 73x.

Here, in the present specification and diagrams, the suffix x represents y (yellow), m (magenta), c (cyan) and k (black), corresponding to the hues.

PATENT DOCUMENT

1. Japanese Laid-Open Patent Application, Laid-Open No. 2005-266775

SUMMARY OF THE INVENTION

In the tandem type scanning optical device, the four optical paths after the deflection means extend through imaging optical elements of the same shape. Therefore, it is necessary to equalize the optical path lengths up to the scan surfaces.

When the light beams are directed from single deflection means to four scan surfaces as in the aforementioned conventional example, the required minimum number of reflective elements is such as follows.

The m-light path and c-light path of the scan surface 8x which is physically closest to the deflection means 5 need two pieces of elements, and y-light path and k-light path of the scan surface 8x which is physically farthest from the deflection means 5 need one piece of element. Thus, six pieces in total. Furthermore, depending on the spacing of the plural scan surfaces or the position of the imaging optical elements, six pieces of reflective elements may be insufficient to secure the light paths. There are examples wherein the number is increased to eight pieces or ten pieces.

In the tandem type scanning optical device which requires a large number of reflective elements as described above, in many cases the light paths are provided with different number of reflective elements.

On the other hand, with regard to the reflective elements used therein, generally a combination of mirrors having different lengths but having the same reflectivity, e.g., those made of a high reflectivity film of AL (aluminum) having a reflectivity of about 90%, is used. However, in such case, the following inconveniences are caused.

(1) Since the optical efficiency is different between the light paths having different numbers of mirrors disposed along the light paths, the light sources should have different luminescence powers. This easily causes a difference in the droop characteristic of the light source or in the harmonic control characteristic between the light paths.

(2) Between the light paths having different numbers of mirrors disposed along the light paths, a difference is easy produced in the field illumination ratio (image plane illumination ratio) upon the scan surface. Particularly, this makes it difficult to correct the field illumination ratio of such light path (e.g., y-light path and k-light path) where a fewer number of mirrors are disposed along the light path.

These inconveniences (1) and (2) will lead to deterioration of the image quality. Particularly, these are a problem in the color image forming apparatus in which high quality image is required.

In patent document No. 1 in this respect, the reflectivities of a plurality of reflective elements in the same light path are made different and, furthermore, the reflectivity angular dependence is added to correct the field illumination ratio.

In recent years, it becomes very important to take into account the relationship of the absolute reflectivity and the reflectivity angular dependence of reflective elements between plural light paths. Particularly, in the tandem type scanning optical device, it is desirable that the optical efficiency and the field illumination ratio between plural light paths are equalized.

The present invention provides a scanning optical device and an image forming apparatus having the same, in which the optical efficiency between different light paths as well as the field illumination ratio of them are well equalized, such that high precision printing can be assured with a simple method.

In accordance with an aspect of the present invention, there is provided a scanning optical device comprising: a plurality of light source means; deflecting means configured to scanningly deflect a plurality of light beams from said plurality of light source means; and an imaging optical system configured to image the plurality of light beams scanningly deflected by a deflecting surface of said deflecting means, upon a plurality of scan surfaces to be scanned, respectively, wherein at least one piece of reflecting element is provided at each of a plurality of light paths extending from the deflecting surface of said deflecting means toward the plurality of scan surfaces, wherein the plurality of light paths extending from the deflecting surface of the deflecting means toward the plurality of scan surfaces are different in the number of reflecting elements provided at the optical path, wherein, when a mean axial reflectivity of a reflecting element or elements at a light path extending from the deflecting surface of said deflecting means toward the scan surface and having a least number of reflecting element or elements is denoted by Ra_ave, a mean axial reflectivity of reflecting elements at a light path extending from the deflecting surface of said deflecting means toward the scan surface and having a largest number of reflecting elements is denoted by Rb_ave, an integrated value of an axial reflectivity of a reflecting element or elements at the light path extending from the deflecting surface of said deflecting means toward the scan surface and having a least number of reflecting element or elements is denoted by $\Pi Ra\_i$, and an integrated value of an axial reflectivity of reflecting elements at a light path extending from the deflecting surface of said deflecting means toward the scan surface and having a largest number of reflecting elements is denoted by $\Pi Rb\_i$, relations $$Ra\_ave < Rb\_ave$$

$$0.9 < \Pi Ra\_i/\Pi Rb\_i < 1.1$$

are satisfied.

In one preferred form of this aspect of the present invention, among the reflecting elements provided at the plurality of light paths extending from the deflecting surface of said deflecting means toward said plurality of scan surfaces, at least one piece of reflecting element at each light path has a reflectivity angular dependence, and wherein, when a mean reflectivity angular dependence of a reflecting element or elements at a light path extending from the deflecting surface of said deflecting means toward the scan surface and having a least number of reflecting element or elements is denoted by $\Delta Ra\_ave$, a mean reflectivity angular dependence of reflecting elements at a light path extending from the deflecting surface of said deflecting means toward the scan surface and having a largest number of reflecting elements is denoted by $\Delta Rb\_ave$, an adding value of the reflectivity angular dependence of a reflecting element or elements at a light path extending from the deflecting surface of said deflecting means toward the scan surface and having a least number of reflecting element or elements is denoted by $\Sigma \Delta Ra\_i$, and an adding value of the reflectivity angular dependence of reflecting elements at a light path extending from the deflecting surface of said deflecting means toward the scan surface and having a largest number of reflecting elements is denoted by $\Sigma \Delta Rb\_i$, a relation $$\Delta Ra\_ave > \Delta Rb\_ave$$

is satisfied, where the reflectivity angular dependence of the reflecting element is defined by an expression "Reflectivity angular dependence"=(axial reflectivity)/(most abaxial reflectivity)−1.

When a minimum axial reflectivity of a reflecting element or elements at a light path extending from the deflecting surface of said deflecting means toward the scan surface and having a least number of reflecting element or elements is denoted by Ra_min, and a minimum axial reflectivity of reflecting elements at a light path extending from the deflecting surface of said deflecting means toward the scan surface and having a largest number of reflecting elements is denoted by Rb_min, a relation $$Ra\_min < Rb\_min$$

may be satisfied.

In a sub-scan section, the light path extending from the deflecting surface of said deflecting means toward the scan surface and having a least number of reflecting element or elements may be a light path extending toward a scan surface which is physically farthest from said deflecting means.

In a sub-scan section, the light path extending from the deflecting surface of said deflecting means toward the scan surface and having a largest number of reflecting elements may be a light path extending toward a scan surface which is physically closest from said deflecting means.

In accordance with another aspect of the present invention, there is provided an image forming apparatus comprising: a plurality of image bearing members disposed at the scan surfaces of the scanning optical device, respectively, as recited above and configured to form images of different colors.

The image forming apparatus may further comprise a printer controller configured to convert color signals supplied from an external machine into imagewise data of different colors, and to input these imagewise data into the scanning optical device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
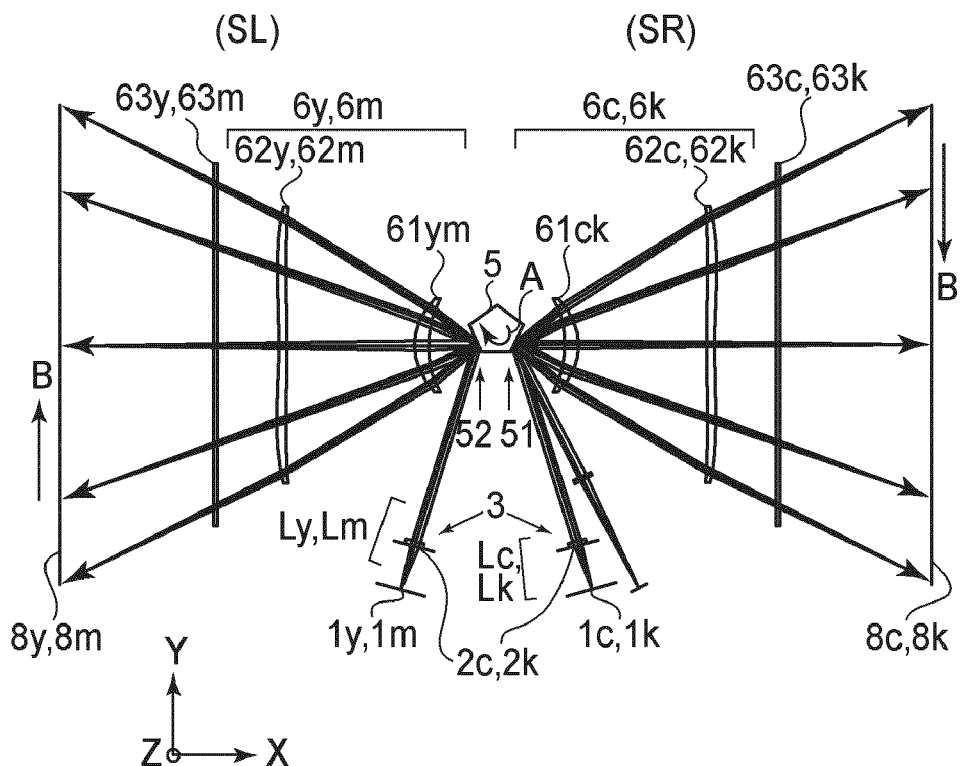
FIG. 1 is a main-scan sectional view of a tandem type scanning optical device according to a first embodiment of the present invention.

FIG. 1 is a sectional view (main-scan sectional view) of a main portion of a tandem type scanning optical device according to a first embodiment of the present invention, along a main-scan direction.

Figure 2:
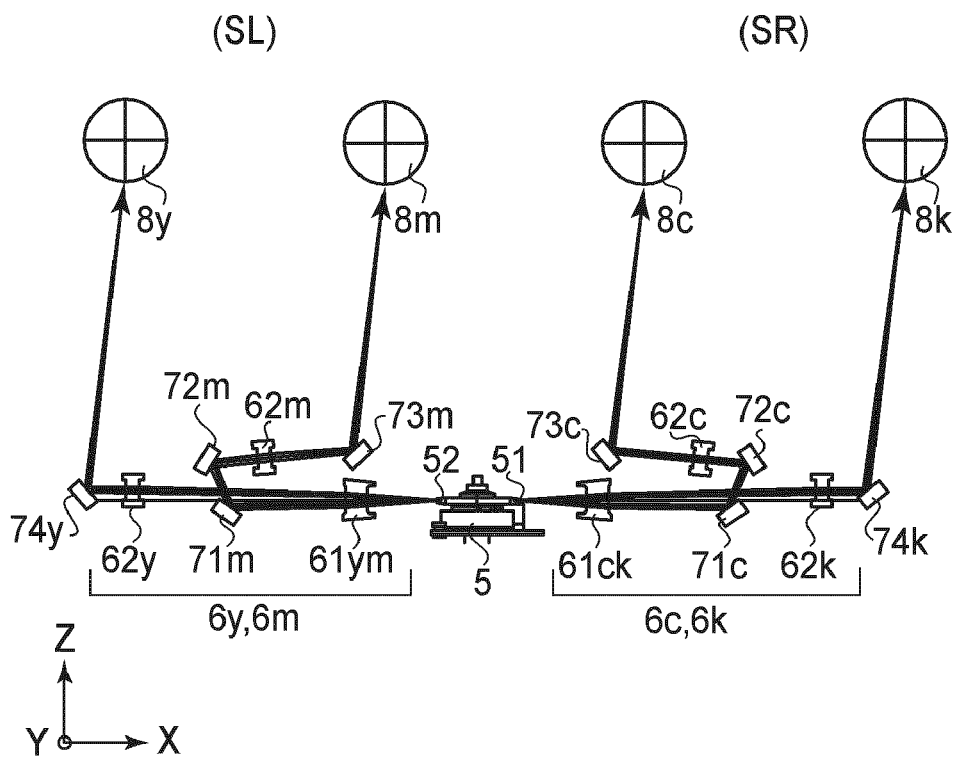
FIG. 2 is a sub-scan sectional view of a portion of the tandem type scanning optical device of the first embodiment, which portion is at the scan surface side of deflecting means thereof.

FIG. 2 is a sectional view (sub-scan sectional view) of a main portion of the tandem type scanning optical device according to the first embodiment of the present invention, along a sub-scan direction.

Figure 3:
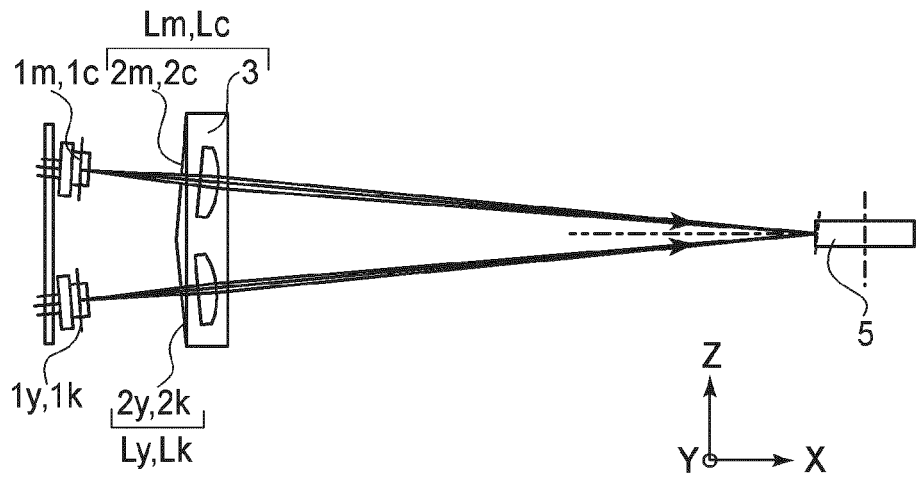
FIG. 3 is a sub-scan sectional view of a portion of the tandem type scanning optical device of the first embodiment, which portion is at the light source means side of the deflecting means thereof.

FIG. 3 is a sub-scan sectional view of a portion of the device of the first embodiment of the present invention which portion is at the light source means side of the deflecting means.

In this specification, the term "main-scan direction" (Y-direction) refers to a direction in which the light beam is scanningly deflected by the deflecting means.

The term "sub-scan direction" (Z-direction) refers to a direction which is parallel to the rotational axis of the deflecting means.

The term "main-scan section" refers to a plane with respect to which the axis of rotation of the deflecting means is a normal.

The term "sub-scan section" refers to a plane with respect to which the main-scan direction (Y-direction) is a normal.

Also in the present specification and the diagrams, as described hereinbefore, the suffix x represents y (yellow), m (magenta), c (cyan) and k (black) corresponding to the hues. Furthermore, "y-k" means y, m, c and k.

In the diagrams, denoted at $1y$-$1k$ are light source means (light sources) each having at least one light emitting member (light emission point). Each light source means is comprised of a semiconductor laser, for example. Denoted at $2y$-$2k$ are stops for restricting the light beam (quantity of light).

Denoted at 3 is an anamorphic collimator lens as light beam converting means. It has a function for converting the state of collection of a plurality of light beams emitted from the plurality of light source means $1y$-$1k$, and also a function for converting the light beams into a line image which extends in the main-scan direction upon the deflecting surface of the deflecting means 5.

It should be noted that the light beam converting means is not limited to an anamorphic collimator lens. It may be provided by a combination of a collimator lens and a cylindrical lens having independent functions, respectively.

Furthermore, the optical elements of stops $2y$-$2k$ and anamorphic collimator lens 3 are components of the input optical system (light collecting optical system) Ly-Lk, respectively.

Denoted at 5 is an optical deflector as the deflecting means (deflection element) which is comprised of a rotary polygonal mirror (polygon mirror) having a plurality of deflecting surfaces. It is rotated at a constant speed in the direction of an arrow A by driving means such as a motor, for example, so as to scanningly deflect the light beams from the input optical system Ly-Lk.

Denoted at SR and SL are stations (scanning units) which are respectively disposed opposed to the optical deflector 5.

Denoted at $6y$-$6k$ are imaging optical systems, respectively. These imaging optical systems function to image a plurality of light beam from the optical deflector 5 upon the scan surfaces (surfaces to be scanned) $8y$-$8k$ corresponding to these light beams, respectively. The imaging optical elements (imaging lenses) which constitute the imaging optical systems $6y$-$6k$ in the present embodiment are made by a plastic mold.

The imaging optical systems $6c$ and $6k$ at the station SR side include a common first imaging lens $61ck$ and second imaging lenses $62c$ and $62k$. The imaging optical systems $6y$ and $6m$ at the station SL side include a common first imaging lens $61ym$ and second imaging lenses $62y$ and $62m$.

The imaging optical systems $6y$-$6k$ function to image the light beams based on the imagewise information and scanningly deflected by the optical deflector 5, upon corresponding photosensitive drum surfaces $8y$-$8k$ as scan surfaces. Additionally, the imaging optical systems $6y$-$6k$ serve to provide a conjugate relationship between the deflecting surfaces 51 and 52 of the optical deflector 5 and the photosensitive drum surfaces $8y$-$8k$, within the sub-scan section, thereby to compensate the surface tilt of the deflecting surfaces 51 and 52.

Denoted at $74k$, $71c$, $72c$ and $73c$ are mirrors (reflecting mirrors) as reflecting elements at the station SR side, which function to bend the light path inside the station SR. Denoted at $74y$, $71m$, $72m$ and $73m$ are mirrors (reflecting mirrors) as reflecting element at the station SL side, which function to bend the light path inside the station SL.

Denoted at $8k$ and $8c$ are photosensitive drum surfaces as the surface to be scanned, at the station SR side. Denoted at $8y$ and $8m$ are photosensitive drum surfaces as the scan surfaces at the station SL side.

In this embodiment, each of the light paths directed to the plurality of scan surfaces $8y$-$8k$ is provided with one or more reflecting elements 1.

Denoted at $63y$-$63k$ are dust-proof glasses which are disposed between the imaging optical systems $6y$-$6k$ and the scan surfaces $8y$-$8k$, to prevent dust or foreign particles from entering into the scanning optical device.

<Scanning Optical Device>

The scanning optical device of the present embodiment is configured to direct light beams emitted from light emitting members of four light source means $1y$-$1k$ to four different scan surfaces $8y$-$8k$, to optically scan them. In the following description of the scanning optical device, for convenience of explanation, only the light path of the light beam emitted from one light source means $1k$ will be described.

A divergent light beam emitted from the semiconductor laser $1k$ (light source means) goes through the stop $2k$ whereby the light quantity of the same is restricted. The light beam is then incident on the anamorphic collimator lens 3. The anamorphic collimator lens 3 converts the light beam from the light source means $1k$ into a parallel light beam with respect to the main-scan section (main-scan direction). With regard to the sub-scan section (sub-scan direction), on the other hand, the anamorphic collimator lens 3 functions to convert the state of the light beam so that it is imaged on the deflecting surface 51 of the optical deflector 5.

The light beam incident on the optical deflector 5 is scanningly deflected by the deflecting surface 51 toward the scan surface, and then it is incident on the imaging optical system

6k. In the embodiment, the imaging optical system 6k is comprised of a first toric lens (imaging lens) 61ck made of plastic and having a power mainly in the main-scan direction and a second toric lens (imaging lens) 62k made of plastic and having a power mainly in the sub-scan direction.

Furthermore, the imaging optical system 6k functions to image the deflected light beam from the deflecting surface 51 and also to compensate the surface tilt of the deflecting surface 51.

The first toric lens 61ck in the present embodiment is shared by the two sets 6c and 6k as described above. It should be noted that the structure of the imaging optical system 6k as well as the manufacturing method therefor are not limited to that described above.

The light beam imaged on the scan surface 8k by the imaging optical system 6k is scanningly deflected along the scan surface 8k in the direction of an arrow B (main-scan direction) at a constant angular speed by the rotation of the polygon mirror which is mounted on a motor shaft (not shown).

<Tandem Type Scanning Optical Device>

The scanning optical device of the present embodiment is a tandem type scanning optical device in which four scanning functions as above are provided to assure that imagewise information corresponding to different hues is recorded on different scan surfaces at the same time. Details will be described below.

As shown in FIG. 3, four light source means 1y-1k in the present embodiment are disposed in a rectangular shape in the main-scan direction and the sub-scan direction.

Among these, the light beams from the light source means 1c and 1k are incident on the deflecting surface 51 of the optical deflector 5, while the light beam from the light source means 1y and 1m are incident on the deflecting surface 52 of the optical deflector 5, whereby these light beams are separated rightwardly and leftwardly of the optical deflector 5.

Furthermore, the light beams from the light source means 1c and 1k are obliquely incident on the optical deflector 5 at different incidence angles within the sub-scan section, such that these light beams are mutually spatially separated by means of a mirror 71c which is placed after the first toric lens 61ck. This is also with the case of the light beams from the light source means 1y and 1m.

As described above, a plurality of light beams having different oblique incidence angles with respect to the deflecting means (polygon mirror) 5 are made incident on the different two deflecting surfaces 51 and 52 of the optical deflector 5. This makes it possible to scan the four light beams at the same time by use of a single optical deflector 5.

<Reflecting Elements>

Next, the reflecting elements used in the present embodiment will be explained.

The light beams from light source means 1y and 1k directed toward the scan surfaces 8y and 8k which are physically farthest from the optical deflector 5 are, after being scanningly deflected deflect by the optical deflector 5, deflected by a single reflecting element (mirror) 74x, respectively, whereby these are directed toward the respective scan surfaces 8x. Hereinafter, the light paths of the light beams from the light source means 1y and 1k directed toward the scan surfaces 8y and 8k, respectively, will be referred to as an "outside light path".

On the other hand, the light beams from light source means 1m and 1c directed toward the scan surfaces 8m and 8c which are physically closest to the optical deflector 5 are, after being scanningly deflected deflect by the optical deflector 5, deflected by three reflecting elements (mirrors) 71x, 72x and 73x, whereby these are directed toward the respective scan surfaces 8x. Hereinafter, the light paths of the light beams from the light source means 1m and 1c directed toward the scan surfaces 8m and 8c, respectively, will be referred to as an "inside light path".

The reason why the number of the reflecting elements differs between the outside light path and the inside light path is that, under the constraint condition that the optical path length has to be equalized in all the light paths, the disposition of the light paths should be determined while taking into account the physical interference between the optical element and the light path and the convenience of assembling, for example.

It should be noted that, although in the present embodiment the number of the used reflecting elements is three at the inside light path and one at the outside light path, the invention is not limited to this. The number of the reflecting elements at the inside light path and the outside light path may be determined in accordance with the spacing of the scan surfaces or the position of the imaging optical element.

<Absolute Reflectivity>

Here, if all the reflecting elements have the same reflectivity, there occurs a difference in optical efficiency between the inside light path and the outside light path. For example, when a high reflectance mirror made of AL (aluminum) and having a reflectivity of 90% is used, there occurs a difference of optical efficiency of 18% between the inside and outside light paths. In this case, if the luminance powers of individual light source means are adjusted differently so as to equalize the light quantities upon the plurality of scan surfaces, it causes a difference in laser characteristic as can be represented by the droop characteristic which leads to deterioration of the image quality.

In the present embodiment in consideration of this, the mean reflectivity of the reflecting elements used at the outside light path (the light path having a least number of reflecting element(s) disposed at the light path) is made lower than that of the inside light path (the light path having a largest number of reflecting elements disposed at the light path). By doing so, the problem mentioned above is solved.

It should be noted that the term "reflectivity" mentioned in this specification refers to the reflectivity which is defined under the actual incidence angle of the axial light beam in the scanning optical device as well as the state of polarization of the same.

More specifically, in the present embodiment, the mean axial reflectivity of a single or plural reflecting elements at the light path having a least number of reflecting element(s) disposed at the light path is denoted by $Ra\_ave$. Also, the mean axial reflectivity of a plurality of reflecting elements at the light path having a largest number of reflecting elements disposed at the light path is denoted by $Rb\_ave$. Here, the reflectivities of the reflecting elements are set so as to satisfy the following condition.

$$Ra\_ave < Rb\_ave \quad (1)$$

If the condition of conditional expression (1) is unsatisfied, the image quality would be undesirably deteriorated.

The reflectivities of the reflecting elements in the first embodiment of the present invention are shown in Table 1.

In the present embodiment as shown in Table 1, the reflectivity of each reflecting element is set as follows.

$$Ra\_ave = 88.0\%$$

$$Rb\_ave = 95.0\%$$

This satisfies conditional expression (1).

Here, it should be noted that, in the present embodiment, the reflection coating film structure is changed such that, among the reflecting elements provided at the light paths extending toward a plurality of scan surfaces, at least one of them has a different reflectivity under the condition in which these reflecting elements are provided.

More specifically, in the embodiment, the reflecting elements 71x-73x disposed at a single light path are made with the same reflection coating film structure. On the other hand, the reflecting element 74k disposed at another light path is made with a different reflection coating film structure. By doing so, the reflection characteristic which is largely different from the former is obtained.

TABLE 1

| Element | Axial Reflectivity | | Most Abaxial Reflectivity | | Angular Dependence | |
|---|---|---|---|---|---|---|
| Inside Light Path | | | | | | |
| 71x | Rb | 95.0% | Rb m | 89.8% | ΔRb | 5.8% |
| 72x | Rb | 95.0% | Rb m | 94.9% | ΔRb | 0.1% |
| 73x | Rb | 95.0% | Rb m | 93.2% | ΔRb | 1.9% |
| Mean | Rb_ave | 95.0% | | | ΔRb_ave | 2.6% |
| Integrated Product Sum | ΠRb_i | 85.7% | | | ΣΔRb_i | 7.8% |
| Outside Light Path | | | | | | |
| 74x | Ra | 88.0% | Ra m | 82.4% | ΔRa | 6.8% |
| Mean | Ra_ave | 88.0% | | | ΔRa_ave | 6.8% |
| Integrated Product Sum | ΠRa_i | 88.0% | | | ΣΔRa_i | 6.8% |

Furthermore, for making uniform the luminance powers of plural light source means, the optical efficiencies of the plural light paths should desirably be equalized.

It is known that, generally, if the difference of the luminance powers between plural light source means exceeds 10%, there occurs a difference in laser characteristic as can be represented by the droop characteristic which leads to deterioration of the image quality.

Here, in the present embodiment, the integrated value of the axial reflectivity of a single or plural reflecting element(s) disposed at a light path having a least number of reflecting element(s) disposed at the light path is denoted by $\Pi Ra\_i$. Also, the integrated value of the axial reflectivity of plural reflecting elements at the light path having a largest number of reflecting elements disposed at the light path is denoted by $\Pi Rb\_i$. Here, the reflectivity of the individual reflecting element is set so as to satisfy the following condition.

$$0.9 < \Pi Ra\_i / \Pi Rb\_i < 1.1 \quad (2)$$

If conditional expression (2) is unsatisfied, there occurs a difference in the laser characteristic as can be represented by the droop characteristic which leads to undesirable deterioration of the image quality.

In the present embodiment, the reflectivities of the reflecting elements are set as shown in Table 1. Hence, in conditional expression (2) it follows that:

$$\Pi Ra\_i / \Pi Rb\_i = 88 / 85.7 = 1.03$$

$$\Pi Ra\_i = 88\%$$

$$\Pi Rb\_i = 0.95 * 0.95 * 0.95 * 100\% = 85.7\%$$

This satisfies conditional expression (2).

More preferably, conditional expression (2) had better be set as follows.

$$0.95 < \Pi Ra\_i / \Pi Rb\_i < 1.05 \quad (2a)$$

<Reflectivity Angular Dependence>

The imaging optical element (imaging lens) used in the present embodiment is made of plastic. With regard to plastic lenses used in scanning optical devices, those without an antireflection coating are the mainstream, this being so from the viewpoint of production. In this embodiment as well, non-coated plastic lenses are used. When a light beam being polarized enters a lens without an antireflection coating, the transmittance is different depending on the field angle. Namely, there is a problem that the image plane illuminance (field illuminance) becomes non-uniform upon the scan surface.

Figure 4:
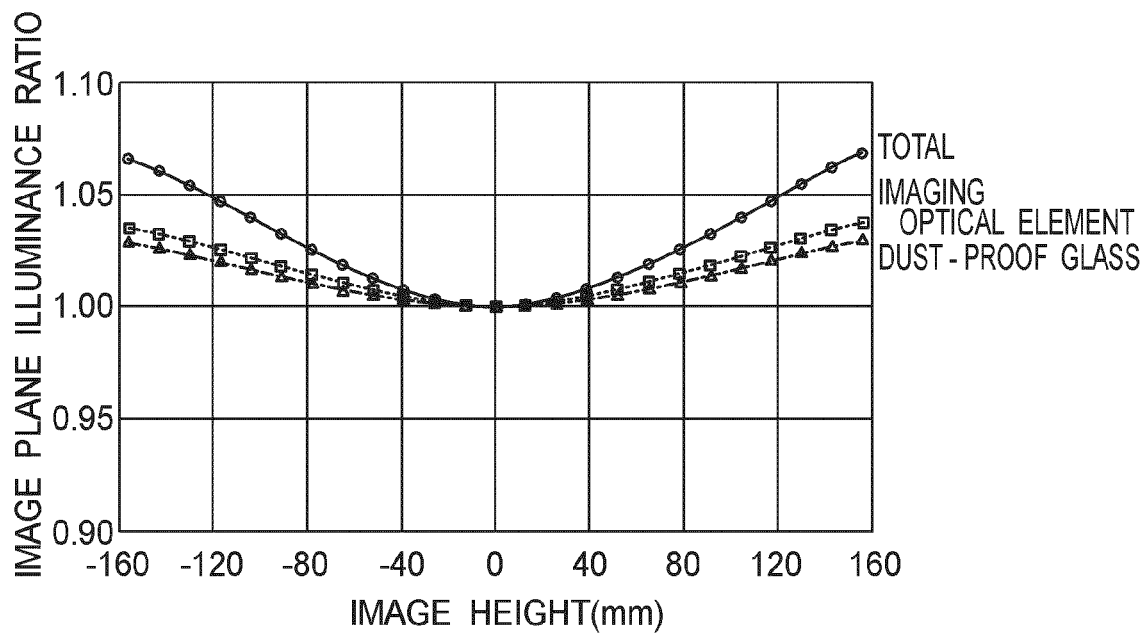
FIG. 4 is a diagram illustrating the field illumination ratio defined by an imaging optical element and a dust-proof glass in the first embodiment of the present invention.

FIG. 4 illustrates the field illumination ratio (the light quantity distribution on the scan surface normalized at the optical axis) in the present embodiment. It is seen from FIG. 4 that, in the present embodiment in which a light beam is incident on an imaging optical element without an antireflection coating under the state of P polarization, as depicted by a dotted line in the diagrams the light quantity of the most abaxial light is raised by the imaging optical element by approximately 4% relative to axial light. The situation differs with the state of polarization, and a reversed characteristic appears under the state of S polarization.

In this embodiment, there is a dust-proof glass between the imaging optical element and the scan surface, for preventing dust or foreign particles from entering the scanning optical device. This dust-proof glass is not provided with an antireflection coating, too. Thus, this dust-proof glass as well is a factor for causing the light quantity distribution on the scan surface. As depicted by a dot-and-dash line in the diagram, the light quantity of the most abaxial light is raised by the dust-proof glass by approximately 3% relative to the axial light.

The non-uniformess of the image plane illuminance caused by various factors such as described above should be corrected by providing the reflecting element with a reverse characteristic, namely, by using a reflecting element having a reflectivity variable with the incidence angle (i.e., having reflectivity angular dependence).

In other words, in the case of a tandem type scanning optical device in which the number of reflecting elements differs between the light paths as in the present embodiment, the mean reflectivity angular dependence of a single or plural reflecting elements at a light path having a least number of reflecting element(s) is denoted by $\Delta Ra\_ave$. On the other hand, the mean reflectivity angular dependence of plural reflecting elements at a light path having a largest number of reflecting elements is denoted by $\Delta Rb\_ave$. Here, the reflectivity angular dependence of the individual reflecting elements is set to satisfy the following condition.

$$\Delta Ra\_ave > \Delta Rb\_ave \quad (3)$$

If the conditional expression (3) is unsatisfied, undesirably it becomes difficult to correct the non-uniformess of the image plane illuminance.

Here, the reflectivity angular dependence can be defined as follows, from the actual incidence angle within the scanning optical device and the reflectivities of the axial and most abaxial light rays depending on the state of polarization.

"Reflectivity angular dependence"=(axial reflectivity)/(most abaxial reflectivity)−1

In the first embodiment as shown in Table 1, the reflectivity angle dependence of each reflecting element is in the following manner.

$$\Delta Ra\_ave = 6.8\%$$

$$\Delta Rb\_ave = 2.6\%$$

This satisfies conditional expression (3).

Furthermore, if the problem is solved by using a structure in which the number of reflecting elements is made different between the light paths as described above, a large reflectivity angular dependence may be given to the reflecting element which is provided at the light path having a least number of reflecting element(s).

Generally, it is difficult to add the angular dependence to a reflecting element having high reflectivity, while on the other hand the angular dependence can be easily added to a reflecting element having low reflectivity. In consideration of this, in this embodiment, the minimum axial reflectivity of a single or plural reflecting elements at a light path having a least number of reflecting element(s) is denoted by Ra_min, and the minimum axial reflectivity of plural reflecting elements at a light path having a largest number of reflecting elements is denoted by Rb_min. Here, the reflectivity of each reflecting element is set so as to satisfy the following condition.

$$Ra\_min < Rb\_min \quad (4)$$

In the present embodiment, in order to satisfy conditional expression (4), the reflectivity Ra_min (88.0%) of the reflecting element is made lower than the reflectivity Rb_min (95.0%) of the plural reflecting elements. This ensures such structure that the reflectivity angular dependence can be easily added to the reflecting element.

Furthermore, in the tandem type scanning optical device, not only the correction of the field illumination ratio but also the equalization of the field illumination ratio between plural scan surfaces are quite important. This is because, if there is unevenness of the field illumination ratio between plural scan surfaces, it causes a density irregularity of the hues and coloring unevenness within the scan region.

Usually, as compared with the density irregularity of a single color, the coloring unevenness after superposition of different colors is more perceivable. Because of this, in the tandem type scanning optical device, equalizing the field illumination ratio between plural scan surfaces is considered very important.

Generally, if the ratio of the adding value of reflectivity angular dependence of reflecting elements at plural light paths becomes more than 30 points, the perceivability of coloring unevenness after the color superposition rises, causing a problem.

In consideration of this, in the present embodiment, the adding value of the reflectivity angular dependence of a single or plural reflecting elements at the light path having a least number of reflecting element(s) disposed at the light path is denoted by $\Sigma\Delta Ra\_i$. Also, the adding value of the reflectivity angular dependence of plural reflecting elements at the light path having a largest number of reflecting elements disposed at the light path is denoted by $\Sigma\Delta Rb\_i$. Here, the reflectivity angular dependence of each reflecting element is set so as to satisfy the following condition.

$$0.7 < \Sigma\Delta Ra\_i / \Sigma\Delta Rb\_i < 1.3 \quad (5)$$

If conditional expression (5) is unsatisfied, the perceivability of coloring unevenness after the color superposition rises, which undesirably causes a problem.

In the present embodiment, the reflectivity angular dependence of each reflecting element is set as shown in Table 1. Hence, in conditional expression (5) it follows that:

$$\Sigma\Delta Ra\_i/\Sigma\Delta Rb\_i = 6.8/7.8 = 0.87$$

$$\Sigma\Delta Ra\_i = 6.8\%$$

$$\Sigma\Delta Rb\_i = 5.8\% + 0.1\% + 1.9\% = 7.8\%$$

This satisfies conditional expression (5).

More preferably, conditional expression (5) had better be set as follows.

$$0.8 < \Sigma\Delta Ra\_i/\Sigma\Delta Rb\_i < 1.2 \quad (5a)$$

Figure 5:
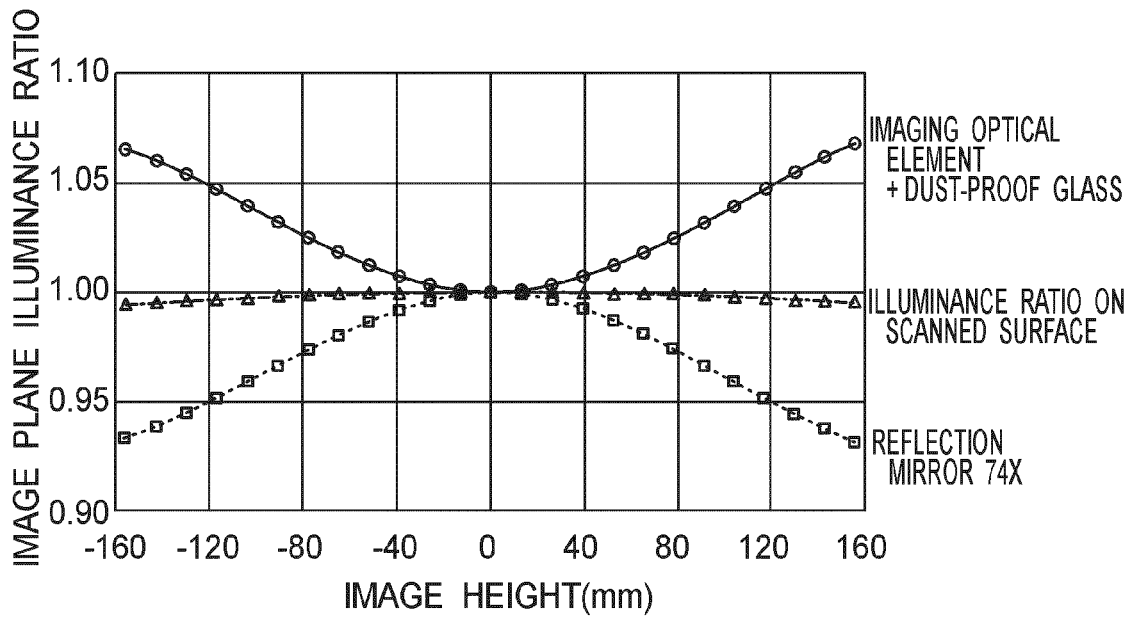
FIG. 5 is a diagram illustrating the field illumination ratio at an outside light path in the first embodiment of the present invention.
Figure 6:
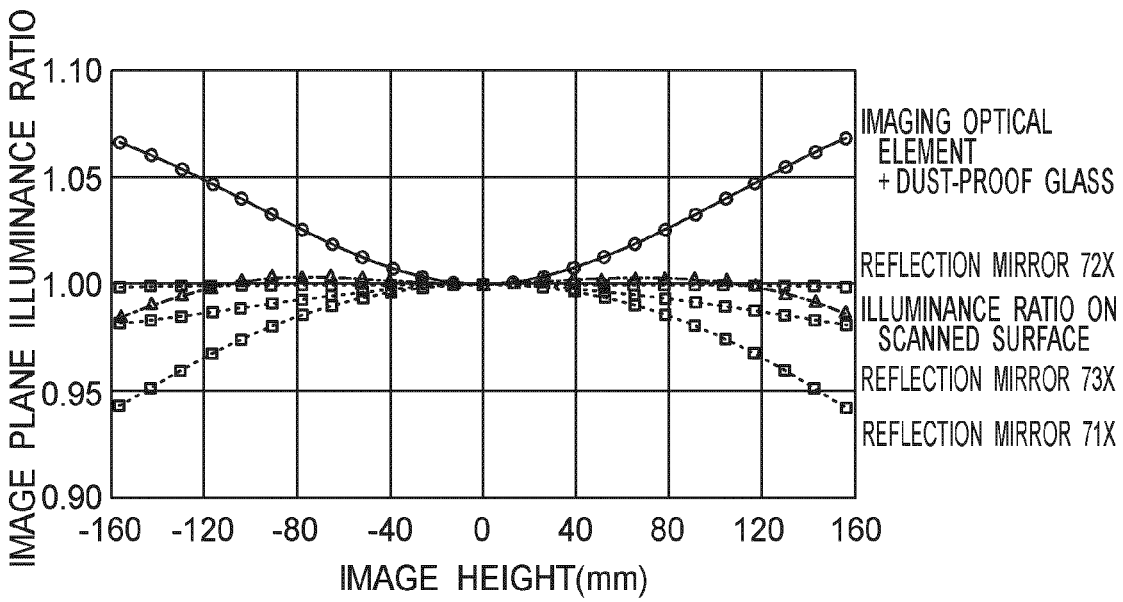
FIG. 6 is a diagram illustrating the field illumination ratio at an inside light path in the first embodiment of the present invention.

FIG. 5 illustrates the field illumination ratio at the outside light path. FIG. 6 illustrates the field illumination ratio at the inside light path. In these diagrams, the solid line depicts the field illumination ratio by the imaging optical element and the dust-proof glass. The dotted line depicts the field illumination ratio by each reflecting mirror. The thick dash-and-dot line depicts the sum of them, that is, the actual field illumination ratio on the scan surface.

It is seen from FIG. 5 and FIG. 6 that, even between the light paths having different numbers of reflecting mirrors, by appropriately setting the angular dependence of the reflecting mirrors so as to satisfy conditional expression (4) and conditional expression (5), the field illumination ratios on both of the scan surfaces can be equalized.

<Color Image Forming Apparatus>

Figure 9:
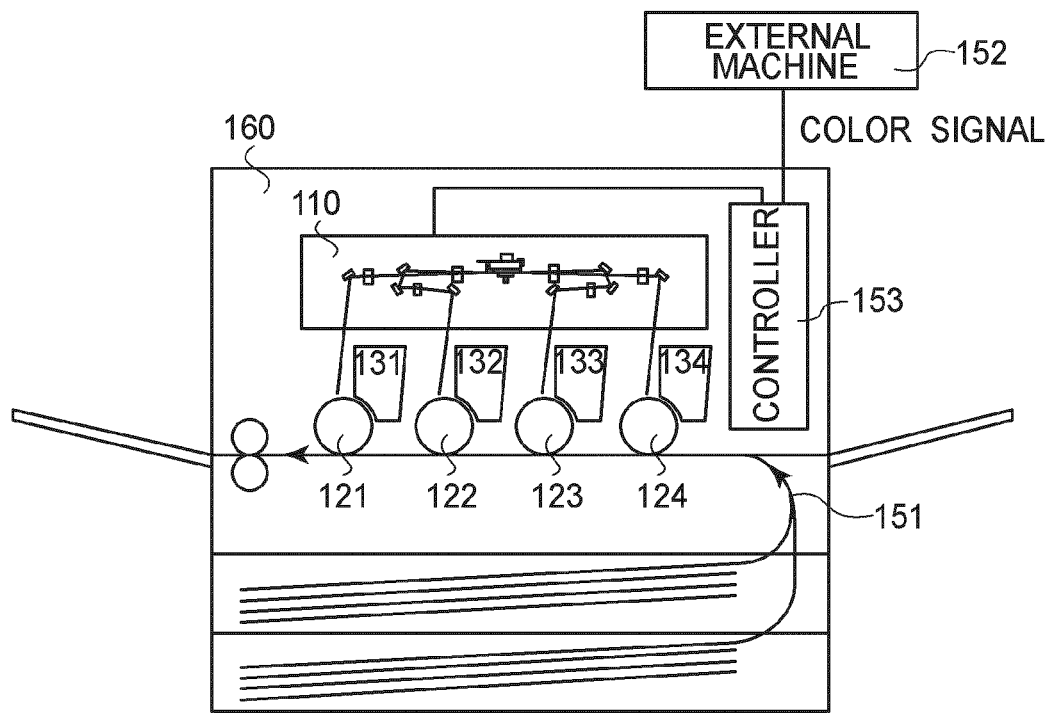
FIG. 9 is schematic diagram of a main portion of a color image forming apparatus of the present invention.
Figure 10:
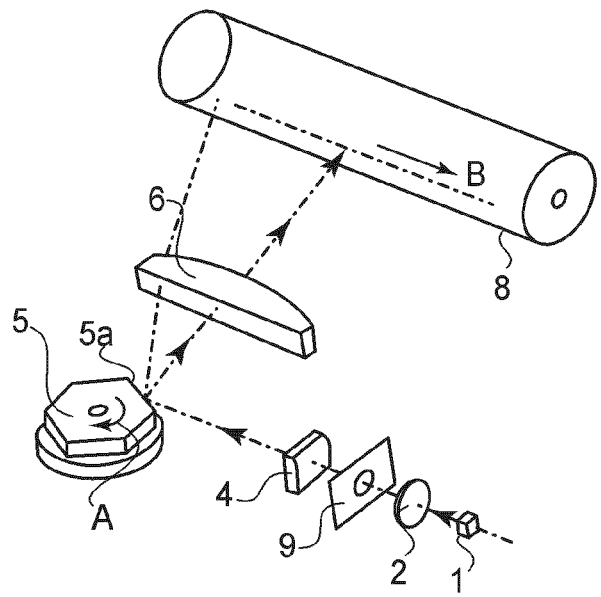
FIG. 10 is perspective view of a main portion of a scanning optical device in a conventional example.
Figure 11:
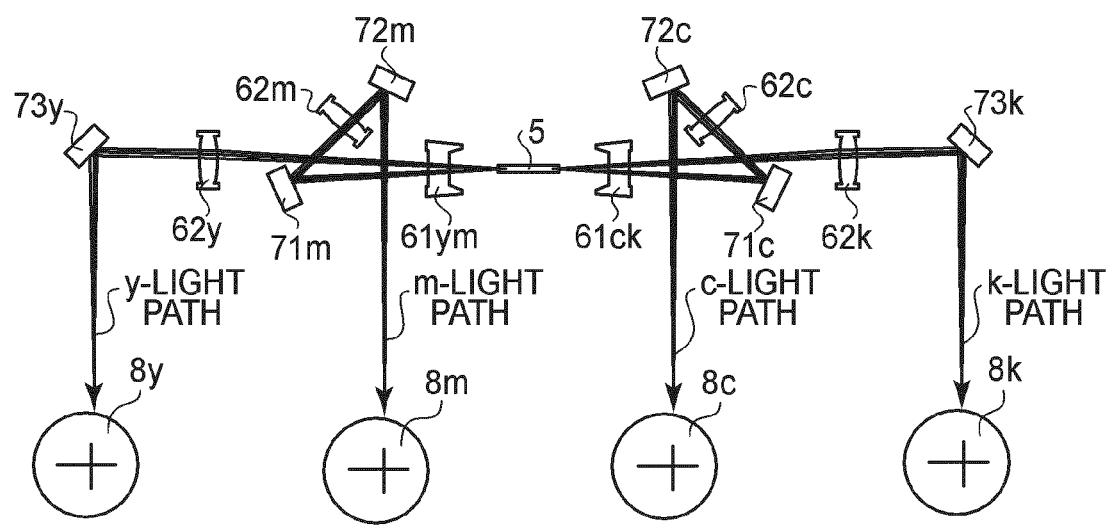
FIG. 11 is a sub-scan sectional view a portion of a tandem type scanning optical device in the conventional example, which portion is at the scan surface side of the deflecting means.

FIG. 9 is a schematic diagram of a main portion of a color image forming apparatus according to the present invention. In FIG. 9, denoted at 160 is a color image forming apparatus, and denoted at 110 is a scanning optical device having a structure described with reference to the first embodiment. Denoted at 121, 122, 123 and 124 are photosensitive drums each being as an image bearing member. Denoted at 131, 132, 133 and 134 are developing devices, and denoted at 151 is a conveyance belt.

In FIG. 9, the color image forming apparatus 160 receives color signals of R (red), G (green) and B (blue) supplied thereto from an external machine 152 such as a personal computer. These color signals are converted into different imagewise data (dot data) corresponding to C (cyan), M (magenta), Y (yellow) and B (black), respectively, by a printer controller 153 inside the apparatus. These imagewise data are inputted into the scanning optical device 110, respectively. Then, from the scanning optical device 110, light beams being modulated depending on the respective imagewise data are projected, and the photosensitive surfaces of the photosensitive drums 121, 122, 123 and 124 are scanned in the main-scan direction with these light beams.

In the color image forming apparatus of the present embodiment, latent images of respective colors are produced upon the photosensitive drum surfaces 121, 122, 123 and 124, respectively, by using four light beams based on the respective imagewise data from the scanning optical device 110, as described above. Subsequently, these images are superposedly transferred to a recording material, whereby one piece of full color image is produced.

The external machine 152 mentioned above may be a color image reading apparatus having a CCD sensor, for example. In such case, a color digital copying machine is constituted by this color image reading apparatus and the color image forming apparatus 160.

In the present embodiment as described above, in a tandem type scanning optical device in which different scan surfaces are scanned simultaneously with a plurality of light beams, the reflectivity and the angular dependence thereof between different light paths having different numbers of reflecting elements are set appropriately. With this arrangement, equalization of the optical efficiency between the light paths in the tandem type scanning optical device as well as the equalization of the field illumination ratio are attained, such that a scanning optical device suitable for high precision printing based on a simple method and an image forming apparatus using the same are accomplished.

Embodiment 2

Figure 7:
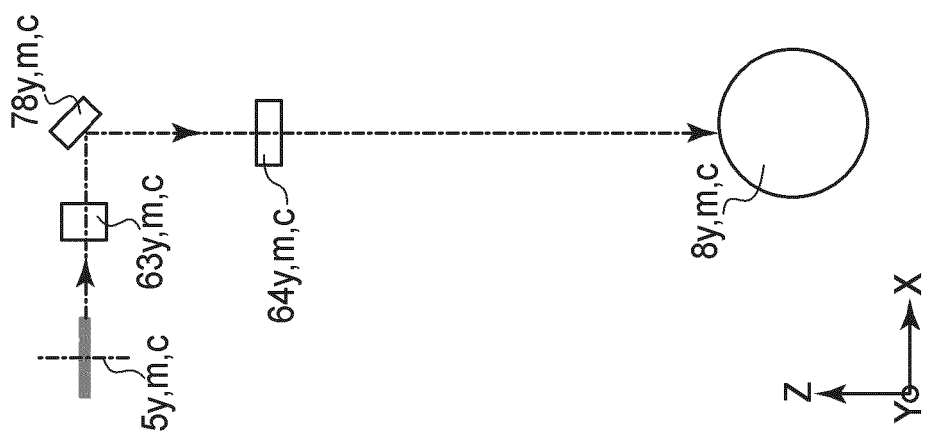
FIG. 7 is a sub-scan sectional view of a color scanning optical device according to a second embodiment of the present invention.

FIG. 7 is a sub-scan sectional view of a scanning optical device (color scanning optical device) for scanning a photosensitive drum surface corresponding to the hues of y (yellow), m (magenta) and c (cyan), according to a second embodiment of the present invention.

Figure 8:
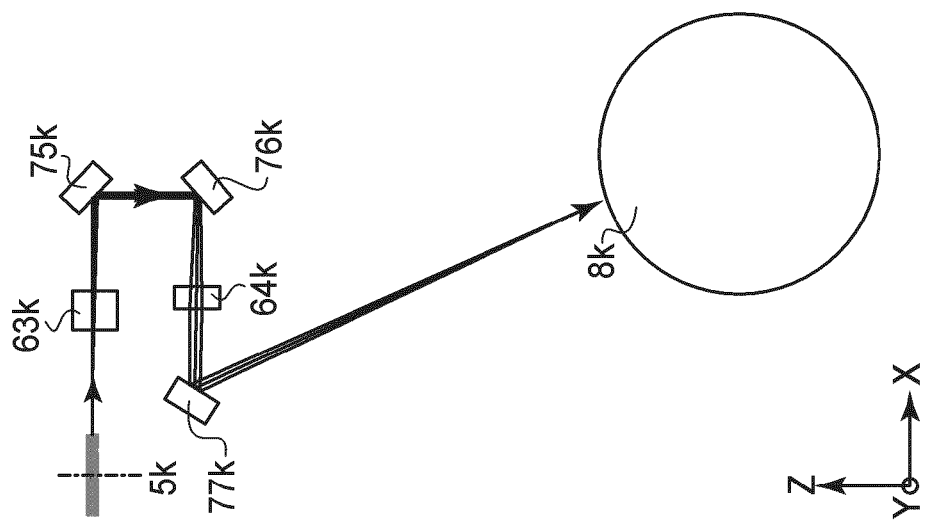
FIG. 8 is a sub-scan sectional view of a monochrome scanning optical device according to the second embodiment of the present invention.

FIG. 8 is a sub-scan sectional view of a scanning optical device (monochrome scanning optical device) for scanning a photosensitive drum surface corresponding to the hue of k (black) in the second embodiment. In FIG. 7 and FIG. 8, like numerals are assigned to components corresponding to those of FIG. 2.

The present embodiment differs from the aforementioned first embodiment in that a scanning optical device for monochrome (k) and scanning optical devices for colors (y, m, c) are separated, and the extension of the light paths is changed. The function as of the scanning optical device and the sectional shape in the main-scan direction are similar to those of the first embodiment. Hence, similar advantageous results as of the first embodiment are obtained.

<Tandem Type Scanning Optical Device>

As shown in FIG. 8, in the scanning optical device for monochrome of the present embodiment, two pieces of reflecting elements 75k and 76k are provided between the imaging optical element 63k and the imaging optical element 64k and, furthermore, one piece of reflecting element 77k is disposed between the imaging optical element 64k and the scan surface 8k. Thus, three pieces of reflecting elements in total are used there. Via these three pieces of reflecting elements 75k, 76k and 77k, the light beam scanningly deflected by the optical deflector 5k is directed to the photosensitive drum surface 8k which is a scan surface, and the optical scanning is carried out.

On the other hand, in the scanning optical devices for colors, as shown in FIG. 7, a single piece of reflecting element 78y,m,c is provided between the imaging optical element 63y,m,c and the imaging optical element 64y,m,c. Via this single piece of reflecting element 78y,m,c, the light beam scanningly deflected by the optical deflector 5y,m,c is directed to the photosensitive drum surface 8y,m,c which is a scan surface for a corresponding color, and the optical scanning is carried out.

More specifically, in the color scanning optical devices, three scanning optical devices corresponding to the hue of y, m and c are disposed in parallel to each other. Thus, a single tandem type scanning optical device is substantively constituted by for scanning optical devices, including these three and the aforementioned single monochrome scanning optical device.

It should be noted that, although in this embodiment the number of the reflecting element(s) is one piece at the light paths for colors and three pieces at the light path for monochrome, the invention is not limited to this. The number of the reflecting elements at the light paths for colors and that at the light path for monochrome may be determined in accordance with the spacing of plural scan surfaces or the position of the imaging optical element.

Since the number of the reflecting elements is different between the scanning optical devices for colors and the scanning optical device for monochrome, which constitute a tandem type scanning optical device, as described above, a similar problem like the first embodiment occurs.

<Absolute Reflectivity>

In the present embodiment as well, the light quantity on plural scan surfaces should be equalized, and the luminance powers of the respective light source means have to be adjusted differently. This would cause a difference in the laser characteristic as can be represented by the droop characteristic, which leads to deterioration of the image quality.

In this embodiment, the mean reflectivity of the reflecting element(s) used at the light path for colors (the light path having a least number of reflecting element(s) disposed at the light path) is made lower than that of the light path for monochrome (the light path having a largest number of reflecting elements disposed at the light path). By doing so, the aforementioned problem is solved.

More specifically, in the present embodiment, the mean axial reflectivity Ra_ave of a single reflecting element at the light path for colors and the mean axial reflectivity Rb_ave of plural reflecting elements at the light path for monochrome are set so as to satisfy the aforementioned conditional expression (1).

Table 2 below shows the reflectivities of the reflecting elements in the second embodiment of the present invention.

TABLE 2

| Element | Axial Reflectivity | | Most Abaxial Reflectivity | | Angular Dependence | |
|---|---|---|---|---|---|---|
| Monochrome Light Path | | | | | | |
| 75x | Rb | 80.0% | Rb m | 74.1% | ΔRb | 8.0% |
| 76x | Rb | 96.0% | Rb m | 96.0% | ΔRb | 0.0% |
| 77x | Rb | 96.0% | Rb m | 96.0% | ΔRb | 0.0% |
| Mean | Rb_ave | 90.7% | | | ΔRb_ave | 2.7% |
| Integrated Product Sum | ΠRb_i | 73.7% | | | ΣΔRb_i | 8.0% |
| Color Light Path | | | | | | |
| 78x | Ra | 75.0% | Ra m | 69.4% | ΔRa | 8.0% |
| Mean | Ra_ave | 75.0% | | | ΔRa_ave | 8.0% |
| Integrated Product Sum | ΠRa_i | 75.0% | | | ΣΔRa_i | 8.0% |

In the present embodiment, as shown in Table 2, the mean axial reflectivity Ra_ave of a single reflecting element at the light path for colors and the mean axial reflectivity Rb_ave of plural reflecting elements at the light path for monochrome are set to be described below, so as to satisfy conditional expression (1).

$Ra\_ave=75.0\%$ $Rb\_ave=90.7\%$

With this configuration, in the present embodiment, similar advantageous results as of the first embodiment are accomplished.

Furthermore, in this embodiment, the ratio between the integrated value ΠRa_i of the axial reflectivity of the single reflecting element at the light path for colors and the integrated value ΠRa_i of the axial reflectivity of the plural reflecting elements at the light path for monochrome is set as follows, to satisfy conditional expression (2).

$\Pi Ra\_i/\Pi Rb\_i=1.02$

With this configuration, similar advantageous results as of the aforementioned first embodiment are obtained.

<Reflectivity Angular Dependence>

Furthermore, in the present embodiment, as shown in Table 2, the mean reflectivity angular dependence ΔRa_ave of a single reflecting element at the light path for colors and the mean reflectivity angular dependence ΔRb_ave of plural reflecting elements at the light path for monochrome are set to be described below, so as to satisfy conditional expression (3).

$\Delta Ra\_ave=8.0\%$ $\Delta Rb\_ave=2.7\%$

With this configuration, similar advantageous results as of the aforementioned first embodiment are obtained.

Furthermore, in the present embodiment, as shown in Table 2, the minimum axial reflectivity (75.0%) of the reflecting element at the light path for colors is made lower than the minimum axial reflectivity (80.0%) of plural reflecting elements at the light path for monochrome, so as to satisfy conditional expression (4). With this configuration, it is assured that the reflectivity angular dependence is easily added to the reflecting element.

Furthermore, in the present embodiment, the ratio between the adding value $\Pi\Delta Ra\_i$ of the reflectivity angular dependence of the single reflecting element at the light path for colors and the adding value $\Pi\Delta Rb\_i$ of the reflectivity angular dependence of the plural reflecting elements at the light path for monochrome is set as follows so as to satisfy conditional expression (5).

$$\Pi\Delta Ra\_i/\Pi\Delta Rb\_i=1.0$$

With this configuration, similar advantageous results as of the aforementioned first embodiment are obtained.

In the present embodiment as described above, even in a tandem type scanning optical device comprised of a combination of plural scanning optical devices, the reflectivity and the angular dependence thereof between different light paths having different numbers of reflecting elements are set appropriately. With this arrangement, equalization of the optical efficiency between the light paths in the tandem type scanning optical device as well as the equalization of the field illumination ratio are attained, such that a scanning optical device suitable for high precision printing based on a simple method and an image forming apparatus using the same are accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-122210 filed May 8, 2008, for which is hereby incorporated by reference.

What is claimed is:

1. A scanning optical device comprising:
a plurality of light source means;
deflecting means configured to scanningly deflect a plurality of light beams from said plurality of light source means; and
an imaging optical system configured to image the plurality of light beams scanningly deflected by a deflecting surface of said deflecting means, upon a plurality of scan surfaces to be scanned, respectively,
wherein at least one piece of aluminum reflecting element is provided at each of a plurality of light paths extending from the deflecting surface of said deflecting means toward the plurality of surfaces to be scanned,
wherein the plurality of light paths extending from the deflecting surface of the deflecting means toward the plurality of surfaces to be scanned are different in the number of aluminum reflecting elements provided at the optical path,
wherein, among the aluminum reflecting elements provided at the plurality of light paths extending from the deflecting surface of said deflecting means toward said plurality of surfaces to be scanned, at least one piece of aluminum reflecting element at each light path has a reflectivity angular dependence,
wherein, when an average of an on-axis reflectivity of an aluminum reflecting element or elements at a light path extending from the deflecting surface of said deflecting means toward the surface to be scanned and having a least number of aluminum reflecting element or elements is denoted by Ra_ave, an average of an on-axis reflectivity of aluminum reflecting elements at a light path extending from the deflecting surface of said deflecting means toward the surface to be scanned and having a largest number of aluminum reflecting elements is denoted by Rb_ave, an integrated value of an on-axis reflectivity of an aluminum reflecting element or elements at the light path extending from the deflecting surface of said deflecting means toward the surface to be scanned and having a least number of aluminum reflecting element or elements is denoted by $\Pi Ra\_i$, and an integrated value of an on-axis reflectivity of aluminum reflecting elements at a light path extending from the deflecting surface of said deflecting means toward the surface to be scanned and having a largest number of aluminum reflecting elements is denoted by $\Pi Rb\_i$, and
wherein, when an average reflectivity angular dependence of an aluminum reflecting element or elements at a light path extending from the deflecting surface of said deflecting means toward the surface to be scanned and having a least number of aluminum reflecting element or elements is denoted by $\Delta Ra\_ave$, an average reflectivity angular dependence of aluminum reflecting elements at a light path extending from the deflecting surface of said deflecting means toward the surface to be scanned and having a largest number of aluminum reflecting elements is denoted by $\Delta Rb\_ave$, an adding value of the reflectivity angular dependence of an aluminum reflecting element or elements at a light path extending from the deflecting surface of said deflecting means toward the surface to be scanned and having a least number of aluminum reflecting element or elements is denoted by $\Sigma\Delta Ra\_i$, and an adding value of the reflectivity angular dependence of aluminum reflecting elements at a light path extending from the deflecting surface of said deflecting means toward the surface to be scanned and having a largest number of aluminum reflecting elements is denoted by $\Sigma\Delta Rb\_i$, relations $Ra\_ave < Rb\_ave$ $0.9 < \Pi Ra\_i/\Pi Rb\_i < 1.1$, $\Delta Ra\_ave > \Delta Rb\_ave$, $0.7 < \Sigma\Delta Ra\_i/\Sigma\Delta Rb\_i < 1.3$ are satisfied, where the reflectivity angular dependence of the aluminum reflecting element is defined by an expression, and
the reflectivity angular dependence is, (on-axis reflectivity)/(most off-axis reflectivity)−1.

2. A scanning optical device as claimed in claim 1, wherein, when a minimum on-axis reflectivity of an aluminum reflecting element or elements at a light path extending from the deflecting surface of said deflecting means toward the surface to be scanned and having a least number of aluminum reflecting element or elements is denoted by Ra_min, and a minimum on-axis reflectivity of aluminum reflecting elements at a light path extending from the deflecting surface of said deflecting means toward the surface to be scanned and having a largest number of aluminum reflecting elements is denoted by Rb_min, a relation $Ra\_min < Rb\_min$ is satisfied.

3. A scanning optical device as claimed in claim 1, wherein, in a sub-scan section, the light path extending from the deflecting surface of said deflecting means toward the surface to be scanned and having a least number of aluminum reflecting element or elements is a light path extending toward a surface to be scanned which is physically farthest from said deflecting means.

4. A scanning optical device as claimed in claim 1, wherein, in a sub-scan section, the light path extending from the deflecting surface of said deflecting means toward the surface to be scanned and having a largest number of aluminum reflecting elements is a light path extending toward a surface to be scanned which is physically closest from said deflecting means.

5. An image forming apparatus comprising:
a plurality of image bearing members disposed at the surfaces to be scanned of the scanning optical device, respectively, as recited in claim 1 and configured to form images of different colors.

6. An image forming apparatus as claimed in claim 5, further comprising a printer controller configured to convert color signals supplied from an external machine into imagewise data of different colors, and to input these imagewise data into the scanning optical device.

* * * * *